(12) United States Patent
Sugaya

(10) Patent No.: US 8,934,888 B2
(45) Date of Patent: Jan. 13, 2015

(54) USER TERMINAL, OPERATOR SERVER, REMOTE SUPPORT METHOD AND USER TERMINAL PROGRAM

(71) Applicant: OPTiM Corporation, Saga-shi (JP)

(72) Inventor: Shunji Sugaya, Tokyo (JP)

(73) Assignee: OPTiM Corporation, Saga-Shi (JP)

( * ) Notice: Subject to any disclaimer, the term of this patent is extended or adjusted under 35 U.S.C. 154(b) by 37 days.

(21) Appl. No.: 13/766,870

(22) Filed: Feb. 14, 2013

(65) Prior Publication Data

US 2014/0113617 A1 Apr. 24, 2014

(51) Int. Cl.
| | |
|---|---|
| *H04M 3/00* | (2006.01) |
| *H04W 8/22* | (2009.01) |
| *G06F 9/48* | (2006.01) |
| *G06F 9/54* | (2006.01) |
| *H04L 29/06* | (2006.01) |

(52) U.S. Cl.
CPC .................. *H04W 8/22* (2013.01); *G06F 9/485* (2013.01); *G06F 9/54* (2013.01); *G06F 9/547* (2013.01); *H04L 67/42* (2013.01)
USPC ........................................................ 455/419

(58) Field of Classification Search
CPC ....... H04W 4/001; H04W 8/22; H04W 4/003; H04W 8/24; H04W 12/06; H04W 48/08; H04W 4/005; H04W 4/008; H04W 60/00; H04W 76/00; H04W 76/02; H04W 88/18; H04W 8/06; H04L 67/025
See application file for complete search history.

(56) References Cited

U.S. PATENT DOCUMENTS

| | | | |
|---|---|---|---|
| 6,580,916 B1 * | 6/2003 | Weisshaar et al. ......... 455/456.1 |
| 6,757,262 B1 * | 6/2004 | Weisshaar et al. ............ 370/310 |
| 8,438,221 B2 * | 5/2013 | Wood et al. ................... 709/203 |
| 8,472,930 B2 * | 6/2013 | Chandhok et al. ......... 455/414.3 |
| 8,544,043 B2 * | 9/2013 | Parekh et al. .................... 725/50 |
| 8,875,309 B1 * | 10/2014 | Diamond et al. ............... 726/29 |
| 2004/0205153 A1 * | 10/2004 | Weisshaar et al. ............ 709/217 |
| 2011/0294490 A1 * | 12/2011 | Faenger ........................ 455/419 |

FOREIGN PATENT DOCUMENTS

| | | |
|---|---|---|
| JP | 2003-006062 | 1/2003 |
| JP | 2006-516061 | 6/2006 |
| JP | 2011-034315 | 2/2011 |
| KR | 1020020029690 | 4/2002 |
| KR | 10-2006-0130666 | 12/2006 |

(Continued)

OTHER PUBLICATIONS

Shunji, Sugaya; "Remote Support Method and System, and Program"; Feb. 17, 2011; JP 2011-034315; Japanese to English Machine Translation.*

*Primary Examiner* — Liton Miah
(74) *Attorney, Agent, or Firm* — Lexyoume IP Meister, PLLC

(57) ABSTRACT

Mutual remote support between users is easily facilitated without troublesome complicated user registration. For user terminals between which remote support is performed and each of which sets a call to be an originator of remote support, a user can use an appropriate supporter user terminal to enable the supporter user terminal to access a supportee user terminal to thereby facilitate setting manipulation and check device (or terminal) status with regard to not only the supportee user terminal but also a supportee device that is communicably connected to the supportee user terminal, by merely selecting the supportee device (or terminal) from an address book stored in the corresponding user terminal.

10 Claims, 14 Drawing Sheets

(56) References Cited  * cited by examiner

FOREIGN PATENT DOCUMENTS

| KR | 10-2009-0036449 | 4/2009 |
| KR | 10-0997265 | 11/2010 |

FIG. 11

<SETTING PAGE ADDRESS LIST>

| DEVICE TYPE INFO. | SETTING PAGE ADDRESS | ID | PW |
|---|---|---|---|
| NW-01 | http://192.168.1.1 | user | XXXX |
| AC-00 | http://admin.co.jp | admin | VVV |
| ⋮ | ⋮ | ⋮ | ⋮ |

FIG. 13

<ADDRESS BOOK LIST>

| OWNER ID | USER TERMINAL ID | ELECTRONIC DEVICE ID | IP ADDRESS | PHONE NUMBER |
|---|---|---|---|---|
| Tanaka | SH-009 | NW-01 | 134.56.xx.xx | aaa-aaaa-aaaa |
| Tanaka | SH-102 | PR-01 | 134.56.yy.yy | bbb-bbbb-bbbb |
| Sato | BR-002 | NULL | 145.67.zz.zz | ccc-cccc-cccc |
| : | : | : | : | : |

FIG. 14

<USER TERMINAL MANAGEMENT TABLE>

| PHONE NUMBER | APPLICATION INSTALLATION STATE | COMPLIANCE INFORMATION |
|---|---|---|
| bbb-bbbb-bbbb | ○ | ○ |
| ccc-cccc-cccc | ○ | x |
| ddd-dddd-dddd | x | ○ |
| ⋮ | ⋮ | ⋮ |

USER TERMINAL, OPERATOR SERVER, REMOTE SUPPORT METHOD AND USER TERMINAL PROGRAM

CROSS-REFERENCE TO RELATED APPLICATION

The present application claims priority to Japanese Patent Application No. 2012-231398 filed on Oct. 19, 2012, which is incorporated herein by reference as if reproduced in its entirety.

BACKGROUND OF THE INVENTION

The present invention relates to a user terminal, an operator server, a remote support method, and a user terminal program, remote support being mutually performed between user terminals.

In recent years, a variety of services have been provided to users by connecting a portable terminal, connected to a public line network, to a web server or the like. Particularly, with the appearance of smart phones (high functional mobile phones), high level services that were conventionally provided by a personal computer can be provided by the mobile phone.

Instead of a server providing services, various functions are mounted in a smart phone itself. Thus, much time may be required for a user to become familiar with all mounted functions. For example, although a function desired by a user is mounted in the smart phone, the user may be unable to use the desired function if it is difficult to be fully aware of a method for setting the function.

Accordingly, a user needs to fully understand setting manipulations and functions of the smart phone in order to maximize the utilization efficiency of high level web services and high level functions of the smart phone. Further, it is sometimes the case that a user who is not familiar with the manipulations of a terminal makes errors by deleting important setting information or making inappropriate settings when initially setting the terminal.

In view of the above, there is disclosed means for remotely setting a user terminal and/or enabling the user to be aware of the user terminal by performing remote support (remote maintenance) on the user terminal. For example, Japanese Patent Application Publication No. 2003-006062 discloses means for enabling a server to obtain screen information of each client and the server to constantly display the screen information as a list to thereby improve the support and monitoring efficiency of the clients.

Further, there is disclosed means for performing a remote manipulation by, e.g., enabling an operator (supporter) terminal to remotely log into a supportee user terminal and sharing a real-time screen. Specifically, by successively transmitting a screen displayed on the user terminal to the operator terminal and manipulating the operator terminal, it is possible to perform input manipulation (remote manipulation) of the user terminal as if directly manipulating the user terminal. Japanese Patent Application Publication No. 2011-034315 discloses a remote support method using a mobile phone.

However, with the explosive dissemination of smart phones and personal computers, the number of users dealing with high-performance information appliances has recently been increasing. Therefore, the number of users with respect to one operator also increases, and thus the time and the service quality that can be devoted to the support per user are expected to deteriorate in inverse proportion to the number of users. In addition, since the operator can freely manipulate an individual device through the remote support, users who are not familiar with information appliances often feel a sense of possibly irrational crisis.

Recently, a system in which a customer serves not only as a service provider but also as a service receiver has been developed beyond the conventional relationship that a company serves to provide a service and a customer receives the service. In such a system, it is possible to create values by facilitating service exchange between customers and enabling companies to prepare environments for facilitating the service exchange instead of providing services.

The present inventor has paid attention to the facts that the number of service providers are significantly increased by enabling users to receive remote support from other users instead of a professional company for providing remote support, and the sense of security of a user who receives remote support from another user can be improved in terms of privacy or a decrease in risk of crime in the case that the user providing the remote support is a member of his/her family, a friend, or the like.

When an operator remotely logs into a user terminal by manipulating an operator terminal, an error may be generated into a device connected to the user terminal in which the operator is logging, instead of the user terminal. For example, when a smart phone receiving remote support is connected to a wireless LAN at home, it is necessary to set a service set identifier (SSID). To that end, it is required to check and manipulate an SSID setting of a wireless router. However, even by logging into the smart phone, it is difficult to check and/or manipulate the SSID setting thereof.

Thus, the present inventor has focused on whether to check and/or manipulate a device that is communicably connected to a supportee device (a smart phone in this example) by using the supportee device.

The present inventor has also attended to the point that manageability can be improved by allowing a user serving as an operator to store each supportee device in a form associated with a corresponding user (owner) when remote support is performed between users. Further, the present inventor has given attention to the fact that, when a desired one of the devices that are communicably connected to terminals is supported as above, an appropriate terminal that needs to be logged into is automatically selected to thereby improve manageability.

Furthermore, the present inventor has paid attention to the point that it is possible to simply provide customer-to-customer remote support without a troublesome complicated user registration process by setting a call to be an originator of remote support in the case of a device, such as a mobile phone, including a call function.

SUMMARY

In view of the above, the present invention provides a user terminal a remote support method, and a user terminal program. Specifically, for user terminals between which remote support is performed and each of which sets a call to be an originator of remote support, a user can use an appropriate supporter user terminal to enable the supporter user terminal to access a supportee user terminal to thereby facilitate setting manipulation and check device (or terminal) status with regard to not only the supportee user terminal but also a supportee device that is communicably connected to the supportee user terminal, by merely selecting the supportee device (or terminal) from an address book stored in the corresponding user terminal.

The following means are provided in the present invention.

In accordance with a first aspect of the present invention, there is provided a user terminal which includes a call function and is communicably connected to a different user terminal through a public line network, one of the user terminals serving as a supportee terminal that receives remote support from the other user terminal or serving as an operator (supporter) terminal that provides remote support to the other user terminal, including user terminal registering means for registering information of at least one different user terminal performing remote support, associated with information related to an owner of the different user terminal, in an address book; and remote support start means for starting the remote support with respect to the user terminal based on the registered information and information related to the user terminal serving as a call counterpart while the call function is used.

According to the first aspect of the present invention, the user terminal which includes the call function and is communicably connected to the different user terminal through the public line network, one of the user terminals serving as the supportee terminal that receives remote support from the other user terminal or serving as the operator (supporter) terminal that provides remote support to the other user terminal, registers the information of at least one different user terminal performing remote support, associated with the information related to the owner of the different user terminal, in the address book; and starts the remote support with respect to the user terminal based on the registered information and the information related to the user terminal serving as the call counterpart while the call function is used.

Although the first aspect of the present invention is in a category of user terminal, the same actions and effects are obtained in categories of the remote support method and the user terminal program.

In accordance with a second aspect of the present invention, there is provided the user terminal of the first aspect, when serving as the supportee terminal, further including electronic device detecting means for detecting an electronic device that is connected to a local area network to which the user terminal is connected; electronic device determining means for determining device type information of the detected electronic device; and operator assisting means for facilitating one of checking of device status and setting manipulation of the electronic device and, when serving as the operator terminal, further including electronic device registering means for registering the determined device type information of the detected electronic device, associated with information related to an owner of the supportee terminal, in the address book; user terminal selecting means for selecting the electronic device registered by the electronic device registering means from the address book to start communications with the user terminal detecting the electronic device as the supportee terminal; and electronic device support means for performing one of checking of device status and setting manipulation of the selected electronic device by using the operator assisting means of the user terminal starting the communications by the user terminal selecting means.

According to the second aspect of the present invention, the user terminal of the first aspect, when serving as the supportee terminal, detects the electronic device that is connected to the local area network to which the user terminal is connected; determines the device type information of the detected electronic device; and facilitates one of checking of device status and setting manipulation of the electronic device and, when serving as the operator terminal, registers the determined device type information of the detected electronic device, associated with information related to the owner of the supportee terminal, in the address book; selects the registered electronic device from the address book to start communications with the user terminal detecting the electronic device as the supportee terminal; and performs one of checking of device status and setting manipulation of the selected electronic device by using the operator assisting means of the user terminal starting the communications by the user terminal selecting means.

In accordance with a third aspect of the present invention, there is provided a remote support method which includes a call function and is communicably connected to a different user terminal through a public line network, one of the user terminals serving as a supportee terminal that receives remote support from the other user terminal or serving as an operator (supporter) terminal that provides remote support to the other user terminal, including registering information of at least one different user terminal performing remote support, associated with information related to an owner of the different user terminal, in an address book; and starting the remote support with respect to the user terminal based on the registered information and information related to the user terminal serving as a call counterpart while the call function is used.

In accordance with a ninth aspect of the present invention, there is provided a user terminal program which is executed by a user terminal that is communicably connected to an operator server, and is communicably connected to a different user terminal through a public line network, one of the user terminals serving as a supportee terminal that receives remote support from the other user terminal or serving as an operator (supporter) terminal that provides remote support to the other user terminal, including registering information of at least one different user terminal performing remote support, associated with information related to an owner of the different user terminal, in an address book; and starting the remote support with respect to the user terminal based on the registered information and information related to the user terminal serving as a call counterpart while the call function is used In accordance with the aspects of the present invention, it is possible to provide a user terminal, an operator server, a remote support method, and a user terminal program. Specifically, as for user terminals between which remote support is performed and each of which sets a call to be an originator of remote support, a user can use an appropriate supporter user terminal to enable the supporter user terminal to access a supportee user terminal to thereby facilitate setting manipulation and check device (or terminal) status with regard to not only the supportee user terminal but also a supportee device that is communicably connected to the supportee user terminal, by merely selecting the supportee device (or terminal) from an address book stored in the corresponding user terminal.

BRIEF DESCRIPTION OF DRAWINGS

FIG. 11 shows a setting page address list stored in the operator server 200;

FIG. 13 is an example of an address book list; and

FIG. 14 is an example of a user terminal management table in a user terminal management database 250 for managing information of a user terminal, included in the operator server 200.

DETAILED DESCRIPTION

Hereinafter, an embodiment of the present invention will be described with reference to the accompanying drawings. This embodiment is merely an example, and the technical scope of the present invention is not limited thereto.

[Outline Of Remote Support System 1]

Figure 1:
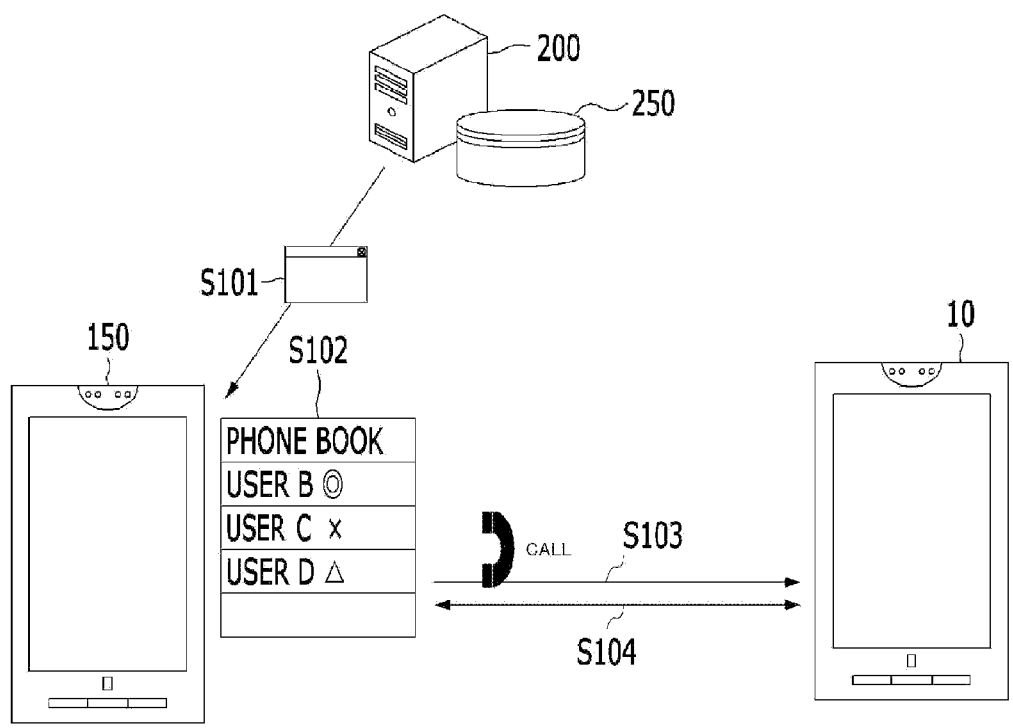
FIG. 1 shows an outline of a remote support system 1.

FIG. 1 shows an outline of a remote support system 1 in accordance with an exemplary embodiment of the present invention. Based on FIG. 1, the outline of the remote support system 1 will be described as follows.

First, a user terminal 150 acquires information related to whether or not each user terminal serving as a call counterpart can perform remote support, from a user terminal management database 250 included in an operator server 200 (step S101). This information may be sequentially inquired in a peer-to-peer mode.

The user terminal 150 inputs a phone number to start to be connected on the phone to a user who starts to perform remote support (step S102). Typically, the input of the phone number is performed by selecting a target terminal from an address book thereof. In the case of inputting a phone number that is not registered in the address book, it is necessary to acquire information related to a counterpart terminal (user terminal 10) by, e.g., using the operator server 200. A call connection may be performed at a first time for other purposes than remote support, and it may be determined to start the remote support in the middle of the call connection.

Here, the address book stores user information such as a phone number, an address, a birthdate, an e-mail address and the like, device information of the user, and device status related to whether or not a device of the user can perform remote support.

Next, the user terminal 150 transmits a call signal to the user terminal 10 to start to be connected on the phone to the user terminal 10 (step S103). After the user terminals 10 and 150 is connected to each other on the phone, the remote support starts according to a request from one of the user terminals 10 and 150 (step S104).

Specifically, one of the user terminal 10 and 150 acquires a phone number of the call counterpart and obtain terminal information of the call counterpart by comparing it with information of the address book, to thereby start the remote support.

In the meantime, only direct friends and acquaintances are typically registered in the address book. However, a recommended operator list may be received from the operator server 200 and added to the address book to recommend indirect persons who are not the direct friends and acquaintances, e.g., operators pertaining to developers of the user terminal 10 and/or individual operators who run individual businesses. In order to make a call connection between indirect persons, one of them may need to know a phone number of a counterpart. Accordingly, a user who knows a phone number of the counterpart may be connected on the phone to a counterpart without notifying his/her phone number of the counterpart. Further, an advertisement display region may be provided in the address book serving as the originator of remote support.

In addition, users' behaviors that harm the interests of others, for example, the behavior of a user who excessively transmits a remote support start request to other users without any reason are determined to be "spam," and the use of the remote support system 1 is inhibited. In the address book, the user is represented as "x." A user terminal management database 250, as shown in FIG. 14, includes two items of "application installation state" and "compliance information." Only when both of the items of "application installation state" and "compliance information" are represented as "○," the remote support can be performed. Typically, when a user is added into the address book, the "application installation state" is represented as "x" and the "compliance information" is represented as "○." In the case of a spam behavior, after the application is installed, the "application installation state" is represented as "○" and the "compliance information" is represented as "x."

Further, users can more smoothly perform the remote support with regard to each other by freely registering a comment related to whether the remote support can be currently performed or not due to being busy, and the like.

After the remote support is started, the user terminal 150 can perform the remote support with regard to not only the user terminal 10 but also an electronic device 50 that is communicably connected to the user terminal 10. Here, the remote support may be directly transmitted in a peer to peer mode without using the operator server 200.

The above mentioned sequences have been described in the case that the user terminal 150 serves as the originator. This is also true in the case that the user terminal 10 serves as the originator by the symmetric property. Further, the phone number is used as information for a call connection service in the above. However, the call connection service may be provided through the internet. In this case, other information for identifying a user, such as an account name, than the phone number may be used.

The outline of the remote support system 1 has been described so far.

[System Structure Of Remote Support System 1]

Figure 2:
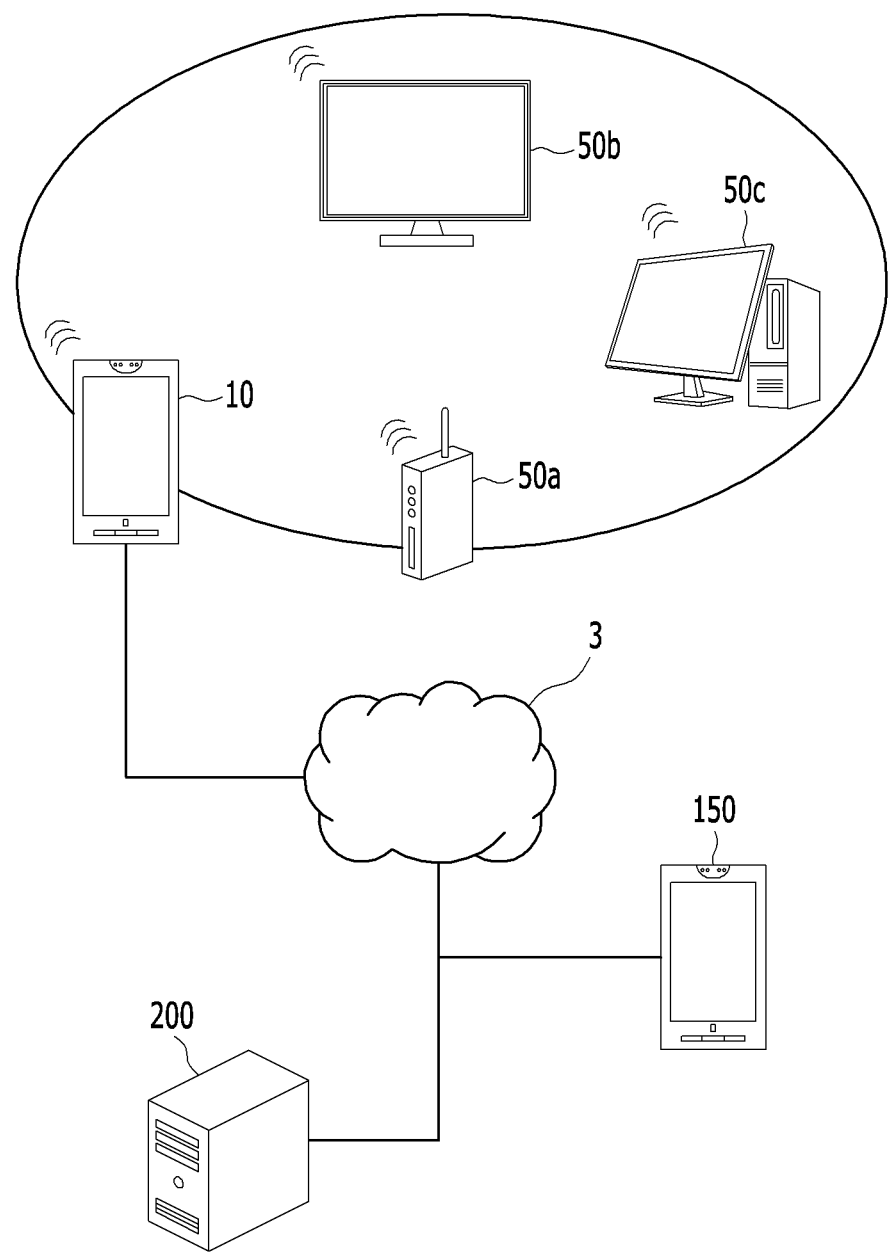
FIG. 2 shows an overall structure of the remote support system 1.

FIG. 2 shows a system structure of the remote support system 1 in accordance with the exemplary embodiment of the present invention. The remote support system 1 includes the user terminal 10; electronic devices 50a, 50b and 50c (collectively referred to as 50); the operator server 200; a public line network 3 (e.g., Internet network, third or fourth generation communications network, or the like); and the user terminal 150.

The user terminal 10 is communicably connected to the operator server 200 through the public line network 3. Each of the electronic devices 50 are connected to the user terminal 10 through a local area network (LAN). The user terminal 10 is connected to the operator server 200 or the user terminal 150 through the public line network 3. The user terminal 150 may be connected to the operator server 200 through the LAN or the public line network 3. The communications can be performed through a wire or in a wireless way in the remote support system 1. The user terminal 10 may perform the communications through a network device such as a router in order to be connected to the public line network 3.

The user terminal 10 is a general information terminal for providing or receiving the remote support and specifically, an information appliance or an electronic device including the following functions. The user terminal 10 includes, e.g., a major appliance (or a white good) such as a refrigerator or a washing machine, a general information appliance such as a telephone, a netbook terminal, a slate terminal, an electronic book terminal, an electronic dictionary terminal, a portable music player and a portable contents recording and playback player, and the like, in addition to a mobile phone, a smart phone, a multi-functional printer, a television, a network device such as a router or a gateway, and a computer.

The electronic device 50 is an electronic device for home or business use, which can performs data communication, and includes, e.g., an electronic information appliance such as a portable phone, a portable information terminal, a network terminal, a slate terminal, an electronic dictionary terminal, a portable music player, an audio component, a content recording and playback player, a printer, a fax machine, a copy machine, a scanner, and an MFP (multi-functional peripheral device or multi-functional printer), a major appliance (or white good) such as a refrigerator, a washing machine, a dishwasher, an electric fan, an air conditioner, an electric stove, a cooker, and a microwave, electric lighting, a server, a router, a gateway, a NAS (network attached storage), and the like, in addition to a personal computer 50c, a television 50b, a telephone, and a computer.

Similar to the user terminal 10, the user terminal 150 is a general information terminal including the following functions. That is, the user terminal 150 has the same functions as those of the user terminal 10. In the present embodiment, the user terminals 10 and 150 are manipulated by different users.

The operator server 200 serves to manage the user terminals 10 and 150, and relay data processing in the remote support and perform various processes. In the present embodiment, the two user terminals 10 and 150 are managed by the operator server 200, but the number of user terminals that can be managed by the operator server 200 may have no actual upper limit.

[Functions]

Figure 3:
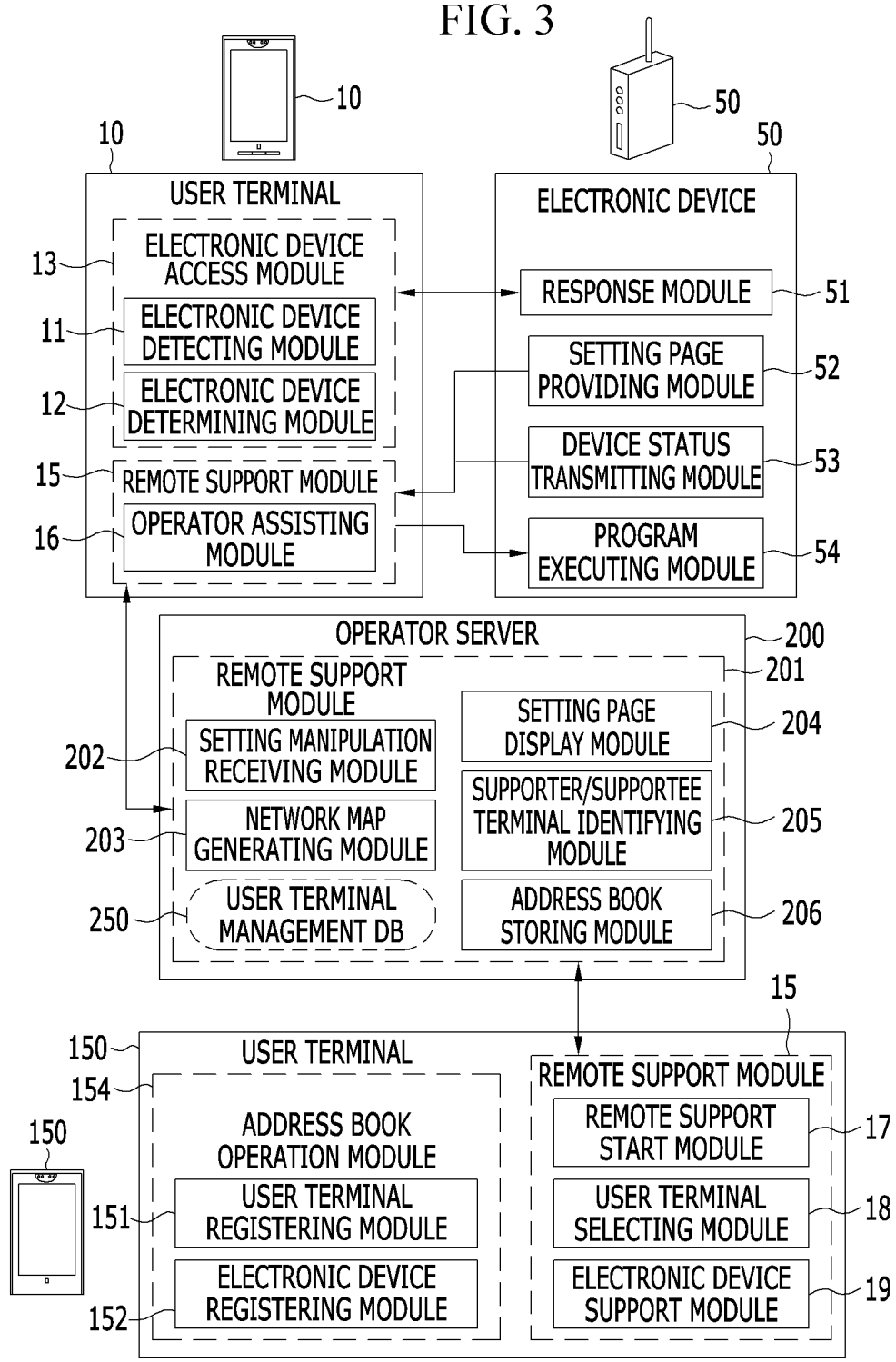
FIG. 3 is a functional block diagram showing an operator server 200, a user terminal 10 and a user terminal 150.

FIG. 3 is a functional block diagram showing the operator server 200, the user terminal 10, and the user terminal 150, and relationships therebetween. Here, an overall functional block diagram of the user terminals 10 and 150 is obtained by integrally combining the functional block diagrams of the user terminals 10 and 150. Specifically, the functional block diagram of the user terminal 10 shows functions of a supportee terminal that receives the remote support, and the functional block diagram of the user terminal 150 shows functions of an operator (supporter) terminal that provides the remote support. However, although not shown, the user terminal 10 further includes the functions of the operator terminal. Similarly, although not shown, the user terminal 150 further includes the functions of the supportee terminal.

Each of the user terminals 10 and 150 includes a control unit formed of a CPU (central processing unit), a RAM (random access memory), a ROM (read only memory), and the like; a communications unit, e.g., a WIFI (wireless fidelity) device conforming to IEEE802.11 or a wireless device conforming to the IMT-2000 standard, such as a third generation mobile communication system; and the like (a LAN connection using a wire is possible).

Each of the user terminals 10 and 150 further includes an input and output unit formed of, e.g., a display unit, for outputting and displaying data and/or images controlled by the control unit; a touch panel, a keyboard, and a mouse for receiving input from a user or an operator; and the like, and a storage unit such as a data storage formed of a hard disk or a semiconductor memory. In the user terminals 10 and 150, the address book to be described later is provided in the storage unit, the address book storing each supportee device, associated with the corresponding user.

In the user terminals 10 and 150, as the control unit reads a predetermined program and cooperates with the communications unit, the input and output unit, and the storage unit, an electronic device access module 13, a remote support module 15, and an address book operation module 154 are realized. The electronic device access module 13 includes an electronic device detecting module 11 for detecting the electronic device 50 that is communicably connected thereto and an electronic device determining module 12 for determining the detected electronic device 50. The remote support module 15 includes an operator assisting module 16 for assisting the manipulation of an operator, a remote support start module 17 for starting the remote support, a user terminal selecting module 18 for selecting and accessing an appropriate logged-in terminal when the electronic device 50 receives the remote support, and an electronic device support module 19 for providing the remote support to the electronic device 50. The address book operation module 154 includes a user terminal registering module 151 for storing each supportee terminal, associated with the corresponding owner, and an electronic registering module 152 for storing each supportee device, associated with the corresponding owner.

Similarly, each of the electronic devices 50 includes a control unit formed of a CPU, a RAM, a ROM, and the like; a communications unit, e.g., a WIFI device conforming to IEEE802.11 or a wireless device conforming to the IMT-2000 standard, such as a third generation mobile communication system; and the like (a LAN connection using a wire is possible). Further, each of the electronic devices 50 includes a storage unit such as a data storage formed of a hard disk or a semiconductor memory.

Furthermore, each of the electronic devices 50 may include an input and output unit formed of, e.g., a display unit, for outputting and displaying data and/or images controlled by the control unit; a touch panel, a keyboard, and a mouse for receiving input from a user or an operator; and the like.

In the electronic devices 50, as the control unit reads a predetermined program and cooperates with the communications unit, the input and output unit and the storage unit, a response module 51 for replying to a packet transmitted from the user terminal 10, a setting page providing module 52 for providing a setting page to be described later, a device status transmitting module 53 for transmitting a device status of the electronic device 50 to the user terminal 10 and a program executing module 54 for executing a predetermining program are realized.

Similar, the operator server 200 includes a control unit formed of a CPU, a RAM, a ROM, and the like; a communications unit, e.g., a WIFI device conforming to IEEE802.11 (a LAN connection using a wire is possible). Further, the operator server 200 includes a storage unit such as a data storage formed of a hard disk or a semiconductor memory. Similar to the user terminals 10 and 150, in the operator server 200, the address book to be described later is provided in the storage unit, the address book storing each supportee device, associated with the corresponding user. In addition, in the operator server 200, the user terminal management database 250 is provided in the storage unit.

As the control unit of the operator server 200 reads a predetermined program and cooperates with the communications unit and the storage unit, a remote support module 201 for enabling an operator to provide the remote support by using the user terminal 150 is realized. The remote support module 201 includes a setting manipulation receiving module 202 for receiving a manipulation from the user terminal 150, a network map generating module 203 for generating a network map of a LAN to which the user terminal 10 is connected, a setting page display module 204 for displaying a setting page to be described later, a supporter/supportee terminal identifying module 205 for identifying a supporter/supportee terminal to perform the remote support, and an address book storing module 206 for storing contents of the address book in the storage unit.

[Remote Support Process]

Figure 4:
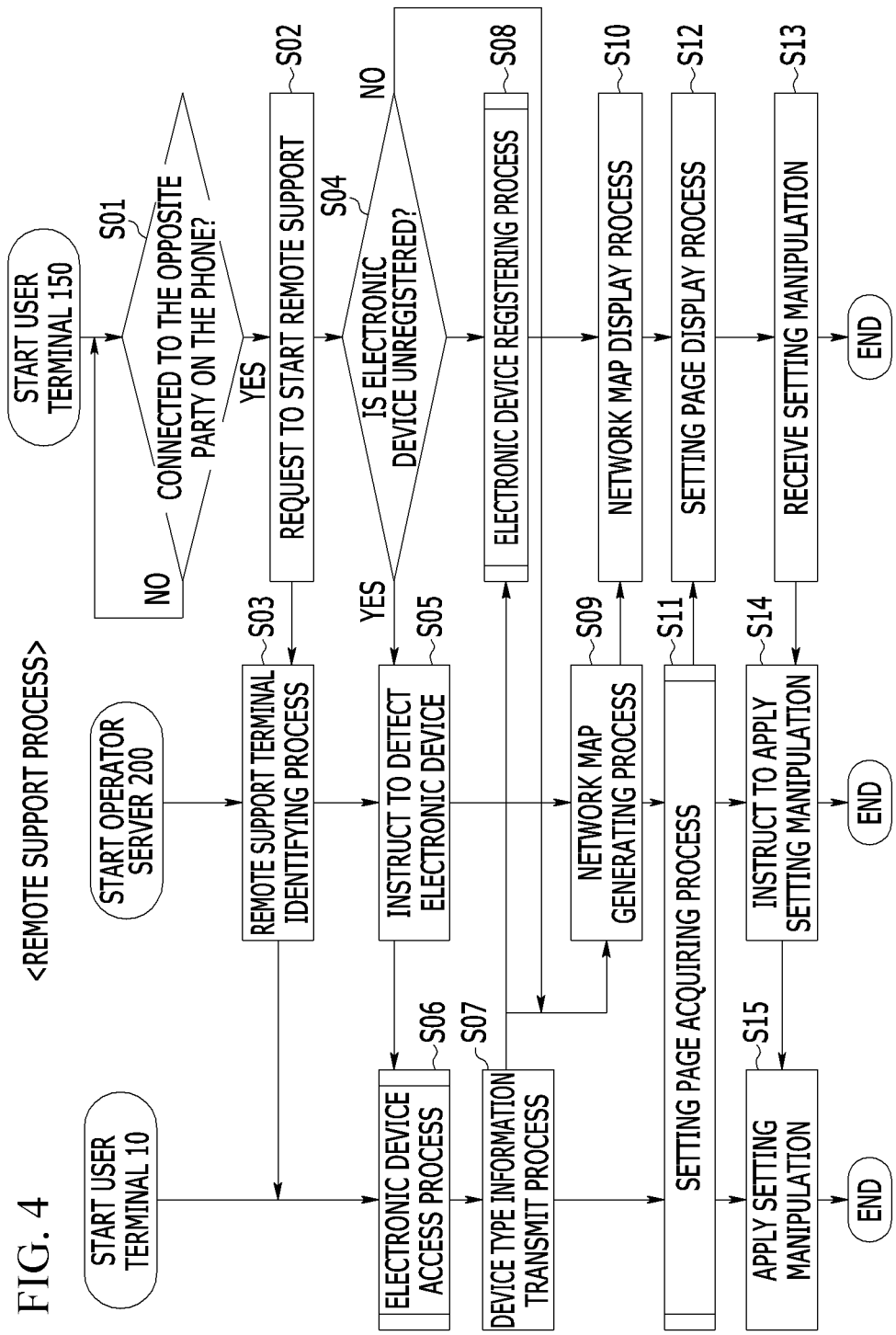
FIG. 4 is a flowchart showing how a remote support process is performed by the operator server 200, the user terminal 10 and the user terminal 150.

FIG. 4 is a flowchart showing how a remote support process is performed by the operator server 200, the user terminal 10, and the user terminal 150. Steps to be executed by the aforementioned modules of each unit will be described together in the present process.

First, the remote support module 15 of the user terminal 150 determines whether or not to be connected to a counterpart terminal performing remote support (step S01). In the case that there is no counterpart terminal performing remote support (step S01: "No"), the process loops in step S01. While the terminals are connected to each other on the phone, the remote support can be performed. Accordingly, the process goes to a next step.

The remote support module 15 transmits a remote support start request to the remote support server 200 or the user terminal 10 at an appropriate timing or by receiving an input from a user (step S02).

FIG. 14 is an example of a user terminal management table in the user terminal management database 250 for managing information of the user terminal, included in the operator server 200. The user terminal management table stores "phone number" of each terminal, "application installation state" and "compliance information." The compliance information is a check list for checking whether or not a nuisance is to be caused, e.g., getting into mischief or sending spam. When a user is determined as being unqualified, the corresponding compliance information is represented as "x," and the use of the remote support system 1 is inhibited. In the user terminal management table of the present embodiment, an owner is identified by combining terminal data and the address book without dealing with information related to owners by using the terminal data only.

Figure 7:
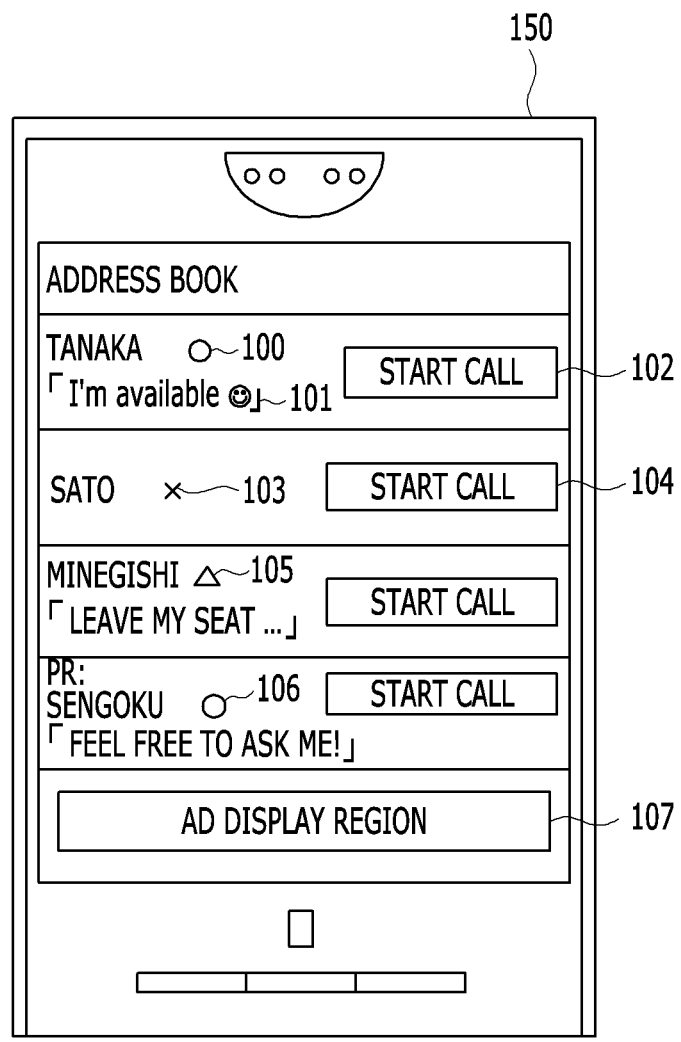
FIG. 7 shows an example of a screen of the user terminal 150 for displaying an address book.

FIG. 7 shows an example of a screen of the user terminal 150 for displaying the address book. For example, on a first row of the address book, the name of a user capable of performing remote support, a remote support status 100, and a comment 101 are displayed. A call start button 102 corresponding to the user is also displayed to transmit a calling signal to the user. In the case that it is difficult to perform the remote support due to, e.g., the compliance information of a user who is not capable of performing remote support, a remote support status 103 represented as "x" is displayed. Accordingly, although a call connection is performed by pushing the call start button 102, it is difficult to start the remote support in the middle of the call connection. Further, when a necessary application is not installed in a terminal of a user, a remote support status 105 represented as "Δ" is displayed. The address book further includes a recommended user 106 transmitted from the operator server 200, and an advertisement display region 107 is provided on the screen.

Figure 8:
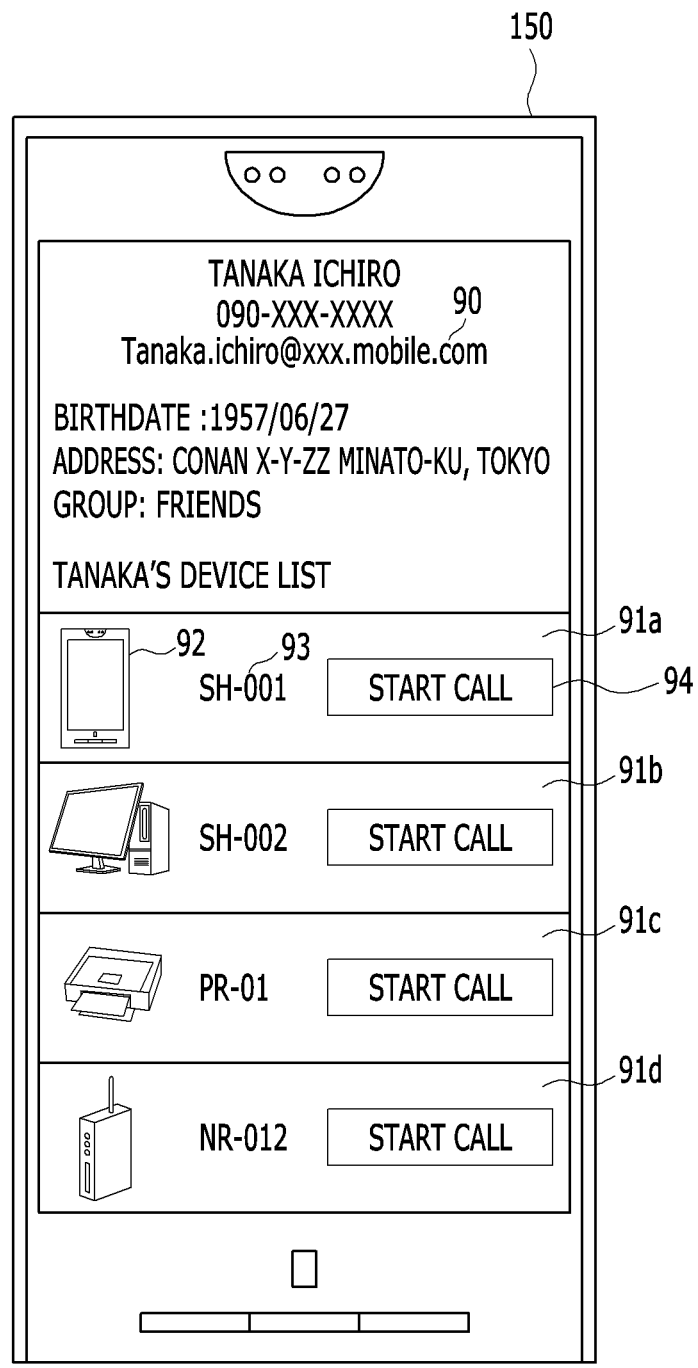
FIG. 8 shows an example of a screen for selecting a device to perform remote support from the address book, displayed on the user terminal 150.

FIG. 8 shows an example of a screen for selecting a device to perform remote support from the address book, displayed on the user terminal 150. After a user is selected, information of each device associated with user information 90 is stored, and a device possessed by the user represented by the corresponding user information 90 is expressed as an icon 92 and listed with a corresponding device ID as shown on, e.g., rows 91a to 91d of the screen. The owner of the user terminal 150 serving as an operator pushes a call start button 94 displayed on a row of the screen on which a desired one of the listed devices is displayed by using a touch panel or a mouse to thereby transmit a call signal to the desired device.

In order for the listed devices to be displayed on the screen as described above, the listed devices need to be registered in the address book in advance. Actual examples of the originator of such remote support may include a family member or a friend requested through a phone, an e-mail, a face-to-face negotiation or the like, a user requested through a community on the Internet such as a social networking site or a bulletin board, an operator recommended by the operator server 200, and the like.

First, a remote support terminal identifying process is performed. Here, the case that the support/supportee terminal identifying module 205 of the operator server identifies the user terminal 10 as a supportee terminal and the user terminal 150 as an operator (supporter) terminal will be described.

[Remote Support Terminal Identifying Process]

Figure 5:
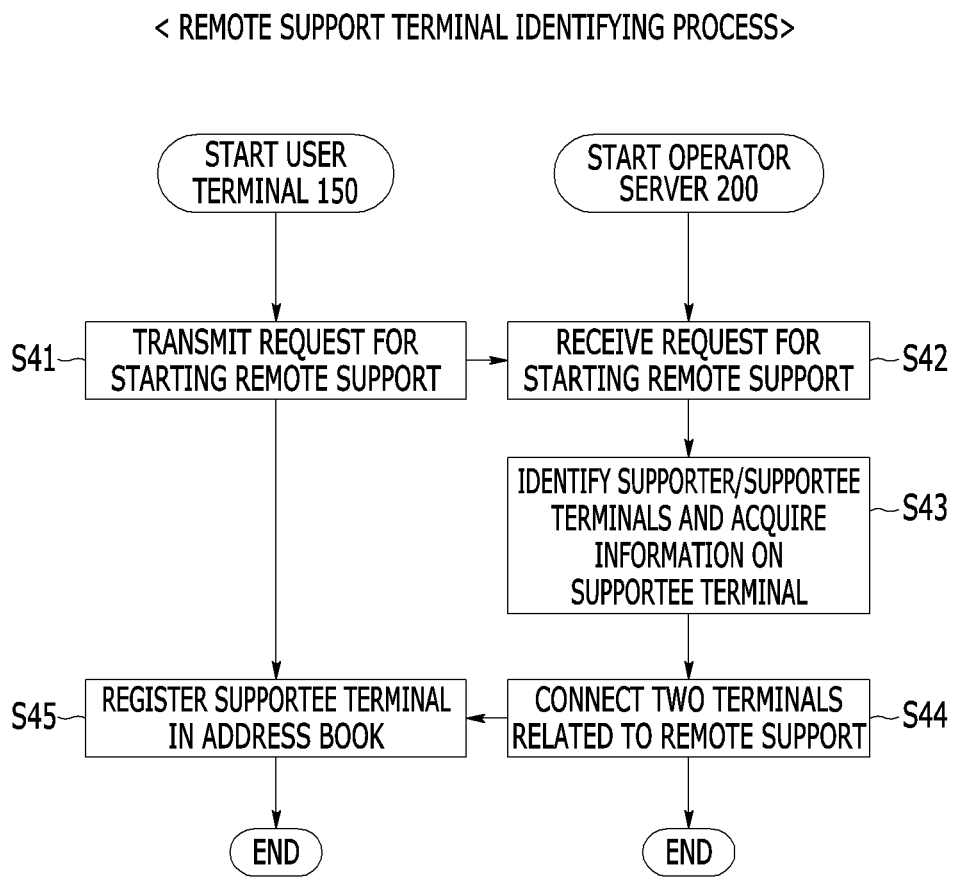
FIG. 5 is a flowchart showing how a remote support terminal identifying process is performed by the operator server 200 and the user terminal 10.

FIG. 5 is a flowchart showing how the remote support terminal identifying process is performed by the operator server 200 and the user terminal 10. Steps to be executed by the aforementioned modules of each unit will be described together in the present process.

First, the remote support module 15 of the user terminal 150 transmits the remote support request to the operator server (step S41). Here, the remote support start request includes information for identifying a counterpart terminal (user terminal 10) performing remote support, such as a phone number. The remote support module 201 of the operator 200 receives the remote support start request (step S42).

The remote support module 201 reads the information included in the received remote support start request to identify the user terminal 150 as the operator (supporter) terminal for providing the remote support and the user terminal 10 as the supportee terminal for receiving the remote support and acquire information related to the user terminal 10 (step S43). The information related to the user terminal 10 includes information related to an owner of the user terminal 10.

Next, the operator server 200 enables the two user terminals 10 to be communicably connected to each other by allowing the user terminal 150 to log into the user terminal 10. Here, screen information displayed on a display unit of the user terminal 10 may be transmitted in such a way as to be visible to the naked eye and/or to be remotely manipulated through the user terminal 150, as in the general remote manipulation from the operator by the remote login to the terminal.

Finally, when the user terminal 10 is not registered in the user terminal 150, the user terminal registering module 151 of the user terminal 150 receives the information related to the owner of the user terminal 10 from the operator server 200 to register, in the address book, the information related to the user terminal 10 and the information related to the owner, to be associated with each other (step S45). As such, it is possible to quickly start the remote support with respect to the user terminal 10 by merely selecting the user terminal 10 from the address book from a next time.

FIG. 13 is an example of an address book list showing an address book in a list form. The address book list includes owner information, user terminal information, electronic device information to be described later, IP address, and phone number, to be associated with each other. The address book list may display "null" to represent "no data." Such an address book may be registered in a file form or in such a form as to be added into the factory default address book of the user terminal 150.

Further, the address book may be managed by a server in order to prepare for the case of a breakdown of the terminal or being used by another terminal. The address book storing module 206 of the operator server 200 may store the address book in the storage unit of the operator server 200 whenever the registration in the address book is performed in step S45 or instead of the registration of the address book. In this case, the address book can be operated as if the address book stored in the user terminal 150 is operated by transmitting data of the address book to the user terminal 150 according to the request of the user terminal 150.

The sequence of the remote support terminal identifying process has been described so far. This process is especially effective when the operator server 200 collectively manages the user terminal information. In the case that the user terminal 150 can access the user terminal 10 in the peer-to-peer mode, for example, the registration of the address book is completed, it is not necessary to perform the remote support terminal identifying process.

Even by the aforementioned steps, the user terminal 150 can perform the remote support on the user terminal 10. For example, support information is displayed on the display unit of the user terminal 150. Specifically, as the user of the user terminal 10 performs the user registration in advance, client information is outputted and the screen information displayed on the display unit of the user terminal 10 is displayed on the display unit of the user terminal 150.

However, when an operator supports the user terminal 10, a problem may be caused by an electronic device 50 that is communicably connected to the user terminal 10. For example, the user terminal 10 may not be able to access the Internet since a problem exists not in the communication setting of the user terminal 10 but in the setting of a router 50a serving as the electronic device 50. Hereinafter, the case of a checking instruction of the electronic device 50 instead of the logged-in user terminal 10 will be described.

Here, the checking instruction is an instruction received from an operator to check information related to the electronic device 50 that is communicably connected to the user terminal 10. As an example of the checking instruction, a checking instruction of a network map including the electronic device 50 may be used. Further, the checking instruction of the electronic device 50 may be received without the limitation to the checking instruction of a network map including the electronic device 50.

Returning to FIG. 4, the remote support module 15 of the user terminal 150 determines whether the electronic device 50 as the target to be checked by the checking instruction is pre or un-registered in the address book. When the electronic device 50 is unregistered (step S04: "Yes"), the process proceeds to step S05. In this case, the checking instruction may pertain to the type of the electronic device 50 connected to the user terminal 10, instead of the details of the electronic device 50. Contrarily, when the electronic device 50 is preregistered (step S04: "No"), the process goes to step S09 without performing next steps. Hereinafter, step S05 and the following steps will be described.

The remote support module 201 of the operator server 200 sends an electronic device detecting instruction to the electronic device access module 13 of the user terminal 10 (step S05). The electronic device detecting instruction serves to allow the electronic device detecting module 11 of the user terminal 10 to detect the electronic device 50 that is communicably connected to the user terminal 10 through the LAN.

The electronic device access module 13 of the user terminal 10 receives the electronic device detecting instruction from the operator server 200 to perform an electronic device access process (step S06). The electronic device access process serves to allow the user terminal 10 to check device type information by transmitting and receiving a predetermining packet. The device type information is information related to the type of device such as a model name and a manufacturer name. In the electronic device access process, the process disclosed in Japanese Patent application Publication No. 2010-097587 for checking the type of electronic device that is connected to a network by transmitting and receiving a packet is used. Then, the electronic device determining module 12 of the user terminal 10 acquires the device type information to perform a next process.

After the device type information is checked, the operator assisting module 16 of the user terminal 10 transmits the device type information to the operator server 200 (step S07). In the case that device type informations are respectively checked with respect to a plurality of electronic devices 50, the respective device type informations are transmitted.

The electronic device 50 corresponding to the checked device type information is not registered in the address book. Accordingly, the electronic device registering module 152 of the user terminal 150 performs an electronic device registering process (step S08).

[Electronic Device Registering Process]

Figure 6:
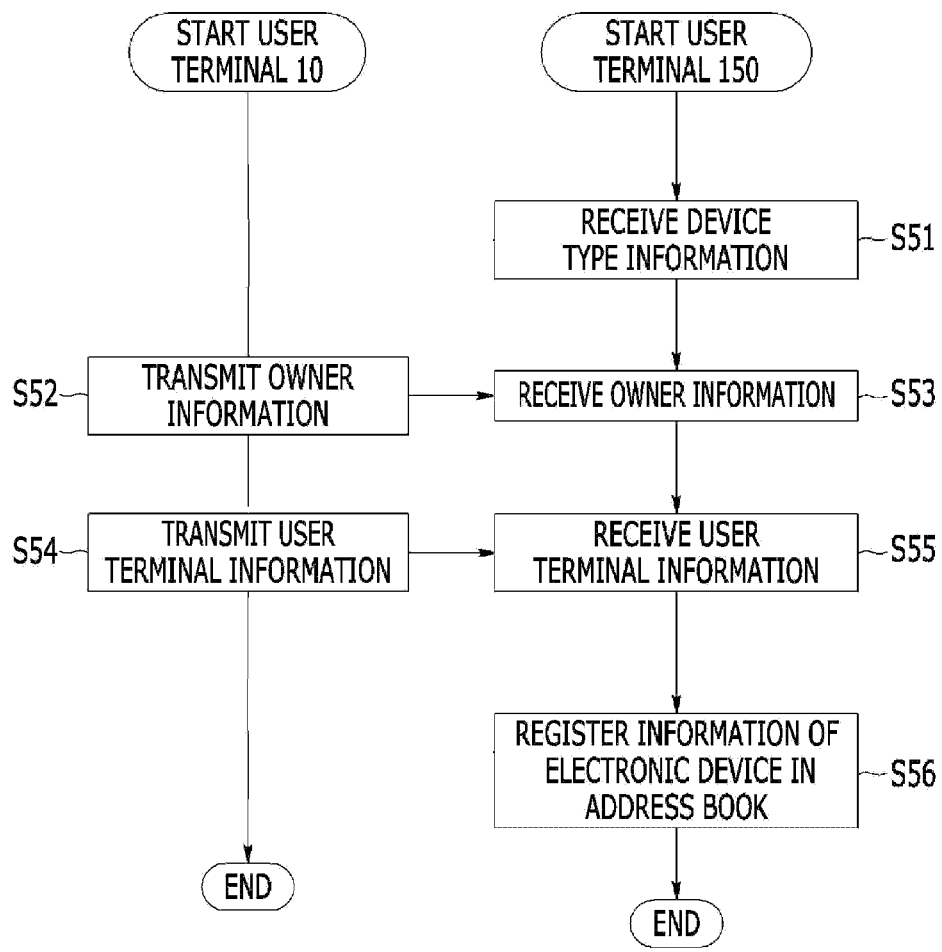
FIG. 6 is a flowchart showing how an electronic device registering process is performed by the user terminal 10 and the user terminal 150.

FIG. 6 is a flowchart showing how the electronic device registering process is performed by the user terminal 10 and the user terminal 150. Steps to be executed by the aforementioned modules of each unit will be described together in the present process. In the present embodiment, the communications between the user terminals 10 and 150 are relayed by the remote support module 201 of the operator server 200. However, in the case that no operator server is provided in the system, the communication between the user terminals may be directly performed.

First, the electronic device registering module 152 of the user terminal 10 acquires device type information of a target electronic device 50 to be registered (step S51). The device type information is transmitted in step S07 described above.

Next, the remote support module 15 of the user terminal 10 transmits owner information related to an owner of the target electronic device 50 (step S52), and the user terminal 150 receives the transmitted owner information (step S53). Similarly, the user terminal 10 transmits user terminal information such as an IP address (step S54), and the user terminal 150 receives the transmitted user terminal information (step S55).

As such, information update is performed by such transmission and receipt. However, if not necessary, the user terminal 150 may use the information pre-stored in the address book or received in step S45 in the remote support terminal identifying process.

Finally, the electronic device registering module 152 stores the type device information and the user terminal information, associated with each other, to register information of the target electronic device 50 in the address book (step S56).

Accordingly, even when an operator or an owner of a supportee terminal does not recognize a terminal that needs to be logged in to support an electronic device, the operator or the owner can automatically select an appropriate user terminal. The sequence of the electronic device registering process has been described so far.

Next, the network map generating module 203 of the operator server 200 generates a network map based on the device type informations (step S09). In the operator server 200, icons for representing the electronic devices in the network map (hereinafter, referred to as electronic device icons), associated with the device type informations, are stored in advance. Accordingly, the corresponding electronic device icons are extracted based on the device type informations to thereby generate the network map. Further, the electronic devices 50 connected to the LAN are represented by using cycles or the like, and the electronic devices 50 connected to the public line network 3 are represented by using cloud-shaped icons or the like. The operator server 200 transmits the generated network map to the user terminal 150.

Figure 9:
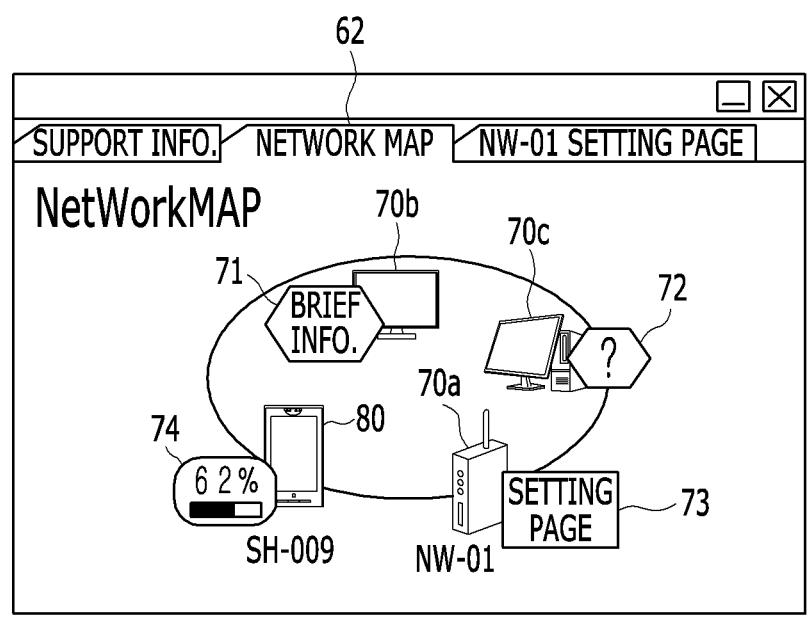
FIG. 9 shows a network map screen displayed on the user terminal 150.

The remote support module 15 of the user terminal 150 receives and displays the transmitted network map (step S10). For example, the network map is shown in FIG. 9. On a remote support window of the user terminal 150, a plurality of window tabs including, e.g., a support information tab 61 and a network map tab 62 are displayed in such a way as to be selectively displayed by the selection of the operator. In the network map, electronic device icons 70*a* to 70*d* are displayed. For example, the router 50*a* and device type information thereof are respectively represented as "electronic device icon 70*a*" and "NW-01." Further, the user terminal 10 is displayed as an icon 80.

Figure 10:
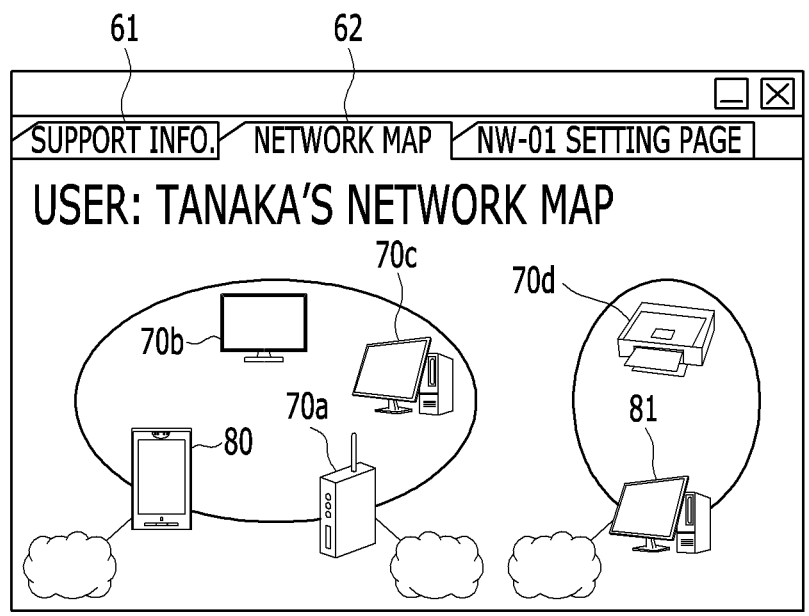
FIG. 10 shows a network map screen for indicating device information, displayed on the user terminal 150.

In addition, in the case that a plurality of independent LANs is provided, the LANs are distinguished into, e.g., a first network of the icon 80 and a second network of an icon 81 as shown in FIG. 10. In this case, when a printer represented as an icon 70*d* is a desired remote support target, it is necessary to selectively log in not the user terminal 10 represented as the icon 80 but a user terminal 10' represented as the icon 81. Such selection is performed by the user terminal selecting module 18 of the user terminal 150.

Further, as shown in FIG. 10, each device status of the electronic devices 50 and the user terminals 10 and 10' are displayed in the vicinity of the corresponding icons thereof on the network map. The device status is information related to the corresponding device or user terminal, including, e.g., the status of a problem in the electronic device 50, the execution status of a program or the like, the progress of installation of a program, existence or non-existence of a setting page to be described later, and brief information related to the electronic device 50. In the setting page, a device status includes a setting state of the electronic device 50.

For example, it is sometimes difficult for the user terminal 10 to check device type information even though the electronic device 50 is detected. In this case, as shown in FIG. 9, an undetermined icon 72 is displayed at the electronic device icon 70*c* to report a problem that corresponding device type information is difficult to check. Further, although it is difficult to check the device type information, information acquired from the electronic device 50 by a request packet is displayed as brief information. This brief information is displayed on the network map by using an icon 71 for indicating whether or not the brief information exists, or the brief information itself is directly displayed on the network map.

Furthermore, the device status may be acquired by using the device status transmitting module 53 serving as a program pre-installed in the electronic device 50. The device status transmitting module 53 regularly acquires the device status of the electronic device 50 to transmit it to the user terminal 10.

In the meantime, as will be described later, in the case that there exists a setting page corresponding to the electronic device 50, a setting page icon 73 is displayed on the network map. In addition, when a program is executed or installed in the electronic device 50, a graph indicating the execution or installation progress is displayed as an icon 74.

[Setting Page Acquiring Process]

Next, the operator server 200, the user terminal 10 and the electronic device 50 perform a setting page acquiring process (step S11).

The setting page is a web page, which is provided from the electronic device 50, capable of facilitating setting manipulation and checking of the device status of the electronic device 50. For example, the router 50*a* serves as a local web server to thereby allow another device to check the setting page of the router 50*a* and perform input manipulation thereof.

Specifically, by inputting a URL or IP address which is provided as a private address by the router 50*a* into a web browser of a computer 50*c* that is communicably connected to the router 50*a* through the LAN, the router 50*a* detects the URL or IP address to display a setting page on the web browser of the computer 50*c*. A user can check the setting page and perform an input manipulation of the setting page through the web browser. As will be described later, it is typically difficult to perform the checking or input manipulation of the setting page through a device (having a global address only) that is connected to a pubic line network.

Figure 12:
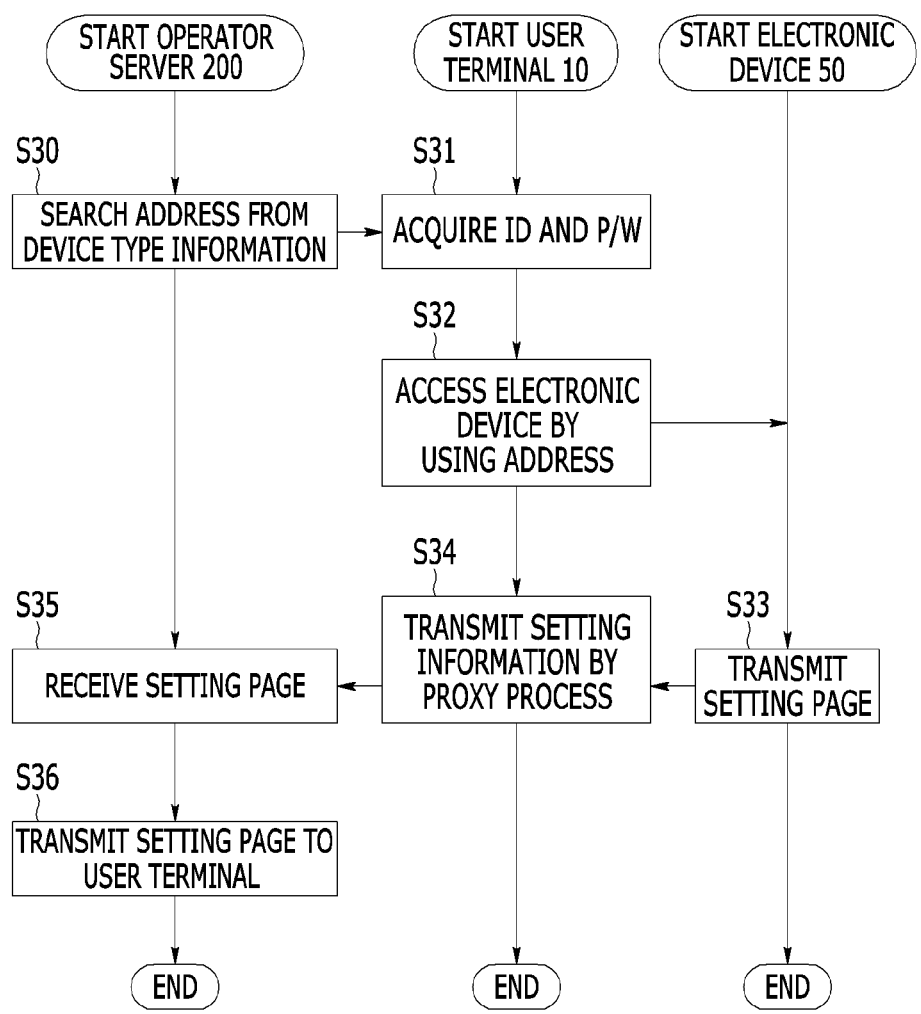
FIG. 12 is a flowchart showing how a setting page acquiring process is performed by the operator server 200, the user terminal 10, and an electronic device 50.

First, referring to FIG. 12, the setting page display module 204 of the operator server 200 searches a setting page address based on the device type information transmitted from the user terminal 10 by referring to a setting page address list shown in FIG. 11 (step S30). The setting page address list is a list including device type information and a URL or IP address of the setting page, associated with each other. For example, when the device type information is "NW-01," the IP address of the setting page is "http://adminco.jp."

In addition, as shown in FIG. 11, the setting page address list may include the device type information, the URL or IP address of the setting page, and an ID and password for the checking and input manipulation of the setting page, associated with each other. The ID and password, which are set in the electronic device 50 as a default, may be an ID and password provided to a manual or the like. By using this ID and password, a user can perform the checking and input manipulation of the setting page even when the user does know the ID and password.

Next, the manipulation receiving module 202 of the operator server 200 transmits the IP address of the setting page to the user terminal 10. At this time, in the case that an ID and password are stored in the setting page address list, the IP address of the setting page associated with the ID and password is transmitted. In this case, a next step S31 is omitted.

In the case that the ID and password are stored in the setting page address list, the setting page providing module 52 of the user terminal 10 acquires the ID and password stored in the user terminal itself (step S31). In this case, the ID and password are stored in the user terminal 10 by the user.

The operator assisting module 16 of the user terminal 10 accesses the electronic device 50 based on the received IP address of the setting page (step S32). Accordingly, the setting page providing module 52 of the electronic device 50 serves as a web server to transmit the setting page to the user terminal 10 (step S33). When receiving the setting page, the user terminal 10 inputs the acquired ID and password to reply to the electronic device 50 and perform the log-in process of the setting page.

Next, the user terminal 10 transmits the setting page to the operator server 200 by a proxy process (step S34). For example, the electronic device 50 is connected to the user terminal 10 through the LAN, and the electronic device 50 and the user terminal 10 respectively have private addresses "192.168.1.1." and "192.168.1.50." Data of the setting page as data A of a transmission source, i.e., the electronic device 50, is transmitted to the user terminal 10 by using the private addresses.

Meanwhile, the user terminal 10 and the operator server 200 are connected to each other through the public line network 3 by using global addresses. The user terminal 10 and the operator server 200 respectively have global addresses "210.0.0.218" and "210.0.0.1." The user terminal 10 changes the data A into data B and the transmission source to the user terminal 10 and transmits the data B to the operator server 200 by using the global addresses.

The operator server 200 receives the setting page by the proxy process (step S35), and transmits the setting page to the user terminal 150 (step S36).

Returning to the remote support process of FIG. 4, the user terminal 150 displays the received setting page (step S12). The displayed setting page serves to facilitate the checking of the device status and the input manipulation of the router 50a. For example, in the case of the router 50a, it is possible to perform the input manipulation of the router 50a and check the device status thereof such as "setting status of a wireless LAN access point," "SSID setting status," or the like.

As described above, the setting page can be checked by the proxy process performed by the user terminal 10. However, the checking of the setting page may be facilitated by a screen transmitting function that is realized by the operator assisting module 16 of the user terminal 10. Specifically, in the case that the checking and the input manipulation of the setting page can also be performed in the user terminal 10, such screen information is transmitted to the operator server 200. By transmitting the screen information as data to the operator server 200, it is possible to effectively use such transmission of the screen information only, without allowing the user terminal 10 to display the setting page, in order to check the setting page. Further, the input manipulation of the setting page can be facilitated by transmitting input information from the user terminal to the electronic device 50 through the user terminal 10.

Further, a program may be installed in the electronic device 50, or a command for setting predetermined data may be received from the operator server 200 and executed by the electronic device 50 through the user terminal 10. In other words, the operator server 200 transmits a predetermined command to the electronic device 50 by receiving a manipulation for setting data or installing a predetermined program with respect to the network map and the electronic device icons displayed on the user terminal 150.

At this time, the operator server 200 may receive the program from another server or transmit a command for allowing the electronic device 50 to download the program by itself. Further, the command for setting predetermined data may be pre-stored in the operator server 200. The command for setting predetermined data may be, e.g., a command for switching between black/white printing and color printing when the electronic device 50 is a printer.

In addition, a predetermined program may be installed in multiple electronic devices 50 displayed on the network map by receiving a command for designating the multiple electronic devices 50 from the operator.

The above mentioned processes have been described in the case that the user terminal 150 serves as the originator. This is also true in the case that the user terminal 10 serves as the originator by the symmetric property.

The aforementioned means and functions are realized by reading and executing a predetermined program by a computer (including a CPU, an information processing apparatus, and various terminals). The program is recorded in a computer-readable recording medium, e.g., a flexible disk, a CD (e.g., a CD-ROM or the like) and a DVD (e.g., a DVD-ROM, a DVD-RAM, or the like). In this case, the program is read from the recording medium by a computer and transmitted to an internal storage unit or an external storage unit to be stored and executed. Further, the program may be pre-stored in a storage unit (recording medium) such as a magnetic disk, an optical disk, or an optical magnetic disk and transmitted from the recording medium to a computer through a communications line.

Hitherto, although the embodiment of the present invention has been described, the present invention is not limited thereto. Further, the effects described in the embodiment of the present invention are merely most exemplary effects obtained from the present invention, but the effects of the present invention are not limited to those specified in the embodiment of the present invention.

What is claimed is:

1. A user terminal which includes a call function and is communicably connected to a different user terminal through a public line network, one of the user terminals serving as a supportee terminal that receives remote support from the other user terminal or serving as an operator (supporter) terminal that provides remote support to the other user terminal, the user terminal comprising:
   a controller configured to execute one or more modules comprising:
   a user terminal registering module means-for registering information of at least one different user terminal performing remote support, associated with information related to an owner of the different user terminal, in an address book;
   a remote support start module means for starting the remote support with respect to the user terminal based on the registered information and information related to the user terminal serving as a call counterpart while the call function is used; wherein when serving as the operator terminal, the one or more modules further comprises:
   an electronic device registering module for registering device type information of an electronic device that is connected to a local area network to which the different user terminal is connected, associated with information related to the owner of the different user terminal, in the address book; and
   an user terminal selecting module for selecting the electronic device registered by said electronic device registering module from the address book to start communications with the different user terminal detecting the electronic device as the supportee terminal; and
   an electronic device support module for performing one of checking of device status and setting manipulation of the selected electronic device.

2. The user terminal of claim 1, wherein
when serving as the supportee terminal, the one or more modules further comprises:

an electronic device detecting module for detecting an electronic device that is connected to a local area network to which the user terminal is connected;

an electronic device determining module for determining device type information of the detected electronic device; and an operator assisting module for facilitating one of checking of device status and setting manipulation of the electronic device, and when serving as the operator terminal, the one or more modules further comprises:

an electronic device registering module for registering the determined device type information of the detected electronic device, associated with information related to an owner of the supportee terminal, in the address book;

an user terminal selecting module for selecting the electronic device registered by said electronic device registering module from the address book to start communications with the user terminal detecting the electronic device as the supportee terminal; and an electronic device support module for performing one of checking of device status and setting manipulation of the selected electronic device by using said operator assisting module of the user terminal starting the communications by said user terminal selecting module.

3. The user terminal of claim 1, further comprising:

a communication unit configured to receive information about a network map of the different user terminal from an operator server, the network map representing the different user terminal, at least one electronic device that is connected to a local area network to which the different user terminal is connected, and a network connection state between the different user terminal and the at least one electronic device; and a display unit configured to display the network map.

4. The user terminal of claim 3, wherein the one or more module further comprises an electronic device support module for selecting an electronic device to be checked by selecting a corresponding electronic device on the network map displayed on the display unit.

5. A remote support method which is performed by a user terminal that includes a call function and is communicably connected to a different user terminal through a public line network, one of the user terminals serving as a supportee terminal that receives remote support from the other user terminal or serving as an operator (supporter) terminal that provides remote support to the other user terminal, the remote support method comprising:

registering information of at least one different user terminal performing remote support, associated with information related to an owner of the different user terminal, in an address book;

starting the remote support with respect to the user terminal based on the registered information and information related to the user terminal serving as a call counterpart while the call function is used; when serving as the operator terminal:

registering device type information of an electronic device that is connected to a local area network to which the different user terminal is connected, associated with information related to the owner of the different user terminal, in the address book; and selecting the electronic device registered by said electronic device registering module from the address book to start communications with the different user terminal detecting the electronic device as the supportee terminal; and performing one of checking of device status and setting manipulation of the selected electronic device.

6. The remote support method of claim 5, further comprising:

receiving information about a network map of the different user terminal from an operator server, the network map representing the different user terminal, at least one electronic device that is connected to a local area network to which the different user terminal is connected, and a network connection state between the different user terminal and the at least one electronic device; and displaying the network map.

7. The remote support method of claim 6, further comprising selecting an electronic device to be checked by selecting a corresponding electronic device on the network map displayed on the display unit.

8. A non-transitory computer-readable recording medium that store a user terminal program which causes a user terminal to perform a remote support method, wherein, that-the user terminal includes a call function and is communicably connected to a different user terminal through a public line network, one of the user terminals serving as a supportee terminal that receives remote support from the other user terminal or serving as an operator (supporter) terminal that provides remote support to the other user terminal, ~the remote support method comprising:

registering information of at least one different user terminal performing remote support, associated with information related to an owner of the different user terminal, in an address book;

starting the remote support with respect to the user terminal based on the registered information and information related to the user terminal serving as a call counterpart while the call function is used; wherein the remote support method further comprises, when serving as the operator terminal:

registering device type information of an electronic device that is connected to a local area network to which the different user terminal is connected, associated with information related to the owner of the different user terminal, in the address book; and selecting the electronic device registered by said electronic device registering module from the address book to start communications with the different user terminal detecting the electronic device as the supportee terminal; and performing one of checking of device status and setting manipulation of the selected electronic device.

9. The recording medium of claim 8, wherein the remote support method further comprises:

receiving information about a network map of the different user terminal from an operator server, the network map representing the different user terminal, at least one electronic device that is connected to a local area network to which the different user terminal is connected, and a network connection state between the different user terminal and the at least one electronic device; and displaying the network map.

10. The recording medium of claim 9, wherein the remote support method further comprises selecting an electronic device to be checked by selecting a corresponding electronic device on the network map displayed on the display unit.

* * * * *